United States Patent
Klein et al.

(10) Patent No.: US 8,996,286 B1
(45) Date of Patent: Mar. 31, 2015

(54) METHOD FOR ANALYZING TRAFFIC PATTERNS TO PROVIDE SOLUTIONS FOR ALLEVIATING TRAFFIC PROBLEMS

(75) Inventors: Daniel Victor Klein, Pittsburgh, PA (US); Dean Kenneth Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 300 days.

(21) Appl. No.: 13/566,941

(22) Filed: Aug. 3, 2012

(51) Int. Cl.
*G06F 19/00* (2011.01)
*G06G 7/70* (2006.01)
*G06G 7/76* (2006.01)
*G08G 1/00* (2006.01)
*G01C 21/34* (2006.01)

(52) U.S. Cl.
CPC .................. *G01C 21/3415* (2013.01)
USPC ........................................ 701/119; 701/117

(58) Field of Classification Search
USPC ......................................................... 701/119
See application file for complete search history.

(56) References Cited

U.S. PATENT DOCUMENTS

| | | | | |
|---|---|---|---|---|
| 3,660,812 A | * | 5/1972 | Inose et al. | 340/911 |
| 4,303,905 A | * | 12/1981 | Drebinger | 340/922 |
| 4,390,951 A | * | 6/1983 | Marcy | 701/117 |
| 5,330,278 A | * | 7/1994 | Raswant | 404/1 |
| 5,444,442 A | * | 8/1995 | Sadakata et al. | 340/916 |
| 5,999,877 A | * | 12/1999 | Takahashi et al. | 701/117 |
| 6,064,318 A | * | 5/2000 | Kirchner et al. | 340/905 |
| 7,289,039 B2 | * | 10/2007 | Kato et al. | 340/905 |
| 7,689,348 B2 | * | 3/2010 | Boss et al. | 701/117 |
| 7,831,380 B2 | | 11/2010 | Chapman et al. | |
| 7,899,611 B2 | | 3/2011 | Downs et al. | |
| 7,912,628 B2 | | 3/2011 | Chapman et al. | |
| 8,478,500 B1 | * | 7/2013 | Vahidi et al. | 701/93 |
| 8,700,294 B2 | * | 4/2014 | Downs et al. | 701/117 |
| 2009/0256910 A1 | * | 10/2009 | Ganeshan | 348/148 |
| 2014/0266798 A1 | * | 9/2014 | Witte et al. | 340/907 |

* cited by examiner

*Primary Examiner* — Nicholas Kiswanto
(74) *Attorney, Agent, or Firm* — Dority & Manning, P.A.

(57) ABSTRACT

A system and method for providing a suggested modification to road characteristics is provided. Signals indicating locations of several users are received at different points in time. A flow of traffic corresponding to the several users is determined based on an analysis of the locations of the several users at the different points in time. A high traffic area is identified in the determined flow of traffic by comparing the determined flow of traffic with a predetermined baseline flow of traffic. Road characteristics in the identified high traffic area are analyzed and a suggested modification to at least one of the road characteristics based on the analyzing of the road characteristics is provided.

21 Claims, 6 Drawing Sheets

METHOD FOR ANALYZING TRAFFIC PATTERNS TO PROVIDE SOLUTIONS FOR ALLEVIATING TRAFFIC PROBLEMS

BACKGROUND

The present disclosure generally relates analyzing traffic patterns, and, in particular, to providing suggested solutions for alleviating traffic problems based on the analysis.

Traffic patterns are often affected by a variety of factors. For example, vehicle accidents, ongoing construction and the volume of vehicles traveling on a particular road may adversely affect the flow of traffic.

SUMMARY

The disclosed subject matter relates to a machine-implemented method for providing a suggested modification to road characteristics. Signals indicating locations of several users are received at different points in time. A flow of traffic corresponding to the several users is determined based on an analysis of the locations of the several users at the different points in time. A high traffic area is identified in the determined flow of traffic by comparing the determined flow of traffic with a predetermined baseline flow of traffic. Road characteristics in the identified high traffic area are analyzed and a suggested modification to at least one of the road characteristics based on the analyzing of the road characteristics is provided.

According to various aspects of the subject technology, a system for providing a suggested modification to road characteristics is provided. The system includes one or more processors and a machine-readable medium comprising instructions stored therein, which when executed by the processors, cause the processors to perform operations including receiving signals for several users that indicate locations of the several users at different points in time, and determining a flow of traffic corresponding to the several users based on an analysis of the locations of the several users at the different points in time. The machine-readable medium also includes instructions for identifying a high traffic area in the determined flow of traffic by comparing the determined flow of traffic with a predetermined baseline flow of traffic. The machine-readable medium further includes instructions for analyzing road structures in the identified high traffic area, and providing a suggested modification to the road structures for a road corresponding to the identified high traffic area based on the analyzing of the road structures.

The disclosed subject matter also relates to a machine-readable medium including instructions stored therein, which when executed by a system, cause the system to perform operations including receiving signals for several users, where the signals indicate locations of the several users at different points in time. The machine-readable medium includes instructions for determining a flow of traffic corresponding to the several users based on an analysis of the locations of the several users at the different points in time. The machine-readable medium also includes instructions for identifying a high traffic area in the determined flow of traffic by comparing the determined flow of traffic with a predetermined baseline flow of traffic. The machine-readable medium further includes instructions for providing a suggested modification to traffic signals for a road based on the identified high traffic area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The amount of traffic and the speed at which traffic travels on a particular roadway are often affected by a variety of factors such as vehicular accidents, construction, volume of vehicles, etc. While certain factors (e.g., accidents, construction) that cause traffic congestion may be spontaneous and unavoidable, other factors (e.g., high volume of vehicles) may be fixable via traffic signal modification or improved civic planning. Thus, it may be desirable to implement a system that identifies high traffic areas in traffic patterns and provides solutions for alleviating the high traffic areas.

The disclosed subject matter relates to a system and machine-implemented method for providing a suggested modification to road characteristics. Signals indicating locations of several users are received at different points in time. A flow of traffic corresponding to the several users is determined based on an analysis of the locations of the several users at the different points in time. A high traffic area is identified in the determined flow of traffic by comparing the determined flow of traffic with a predetermined baseline flow of traffic. Road characteristics in the identified high traffic area are analyzed and a suggested modification to at least one of the road characteristics based on the analyzing of the road characteristics is provided.

Figure 1:
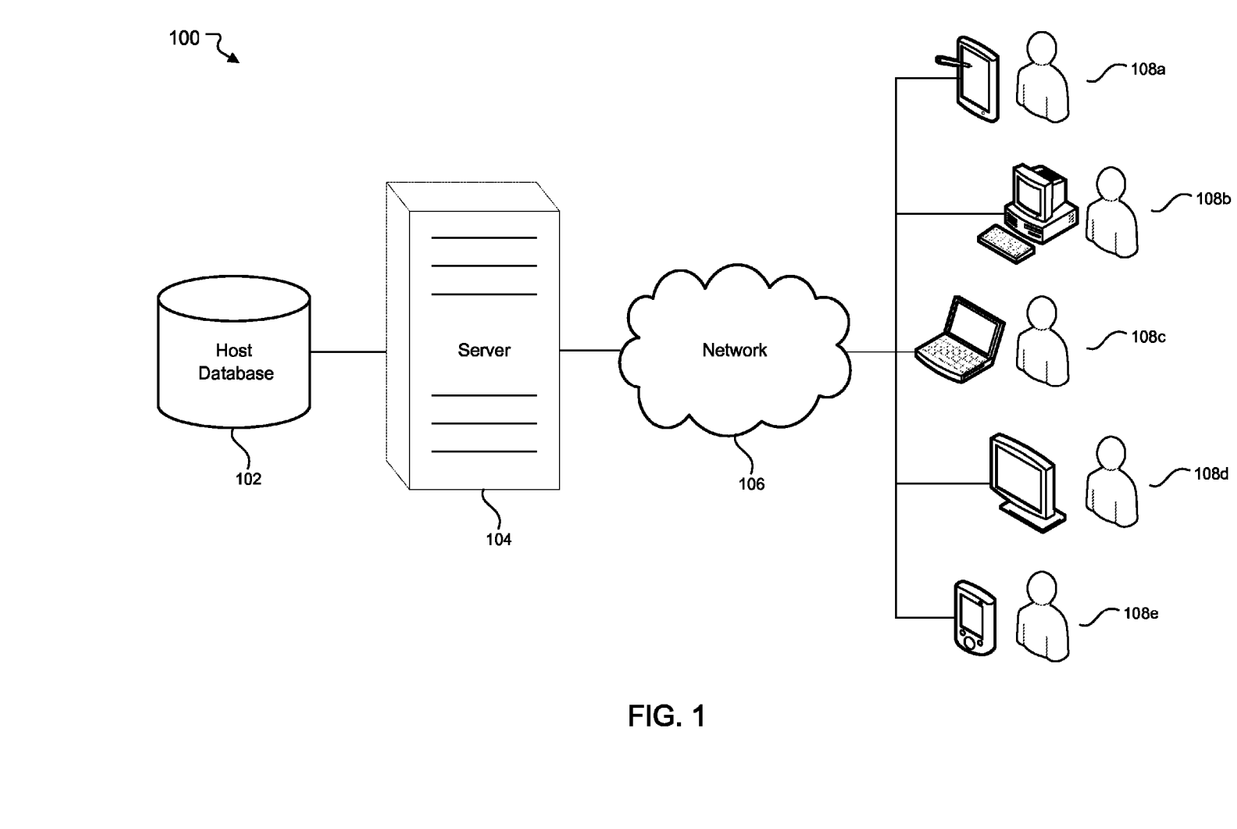
FIG. 1 illustrates an example network environment which provides for identifying high traffic areas in determined traffic flows and providing suggested modifications to road characteristics.

FIG. 1 illustrates an example network environment which provides for identifying high traffic areas in determined traffic flows and providing suggested modifications to road characteristics. Network environment 100 includes a data repository 102 (e.g., computer-readable storage media) for storing a variety of data accessed by web-based applications. While the network environment 100 includes a single data repository 102 in FIG. 1, the network environment may include additional data repository in some implementations. Data repository 102 may store maps and road characteristics. Road characteristics include road structures (e.g., number of lanes, direction of traffic, and number of intersections) and traffic signals (e.g., traffic sign, traffic director, traffic light, etc.).

The network environment 100 further includes server 104. While the network environment 100 includes a single server in FIG. 1, the network environment may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from data repository 102 and serve the set of information to client devices 108a-108e.

Each of client devices 108a-108e can represent various forms of processing devices. Examples of a processing device can include a desktop computer, a laptop computer, a handheld computer, a television with one or more processors embedded or coupled thereto, a personal digital assistant (PDA), a cellular telephone, a network appliance, a camera, a smart phone, an enhanced general packet radio service (EG-PRS) mobile phone, a media player, a navigation device, an email device, a game console, or a combination of any these data processing devices or other data processing devices. Each of client devices 108a-108e may be any machine configured to generate and transmit a signal that includes location information (e.g., GPS coordinates) to server 104. In some aspects, client devices 108a-108e may include one or more client applications (e.g., mapping applications, GPS applications, or other processes) configured to generate and transmit GPS signals to a server. The GPS signals may include GPS coordinates (e.g., longitude and latitude coordinates) and, in some cases, a time stamp indicating when the GPS signal was generated.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
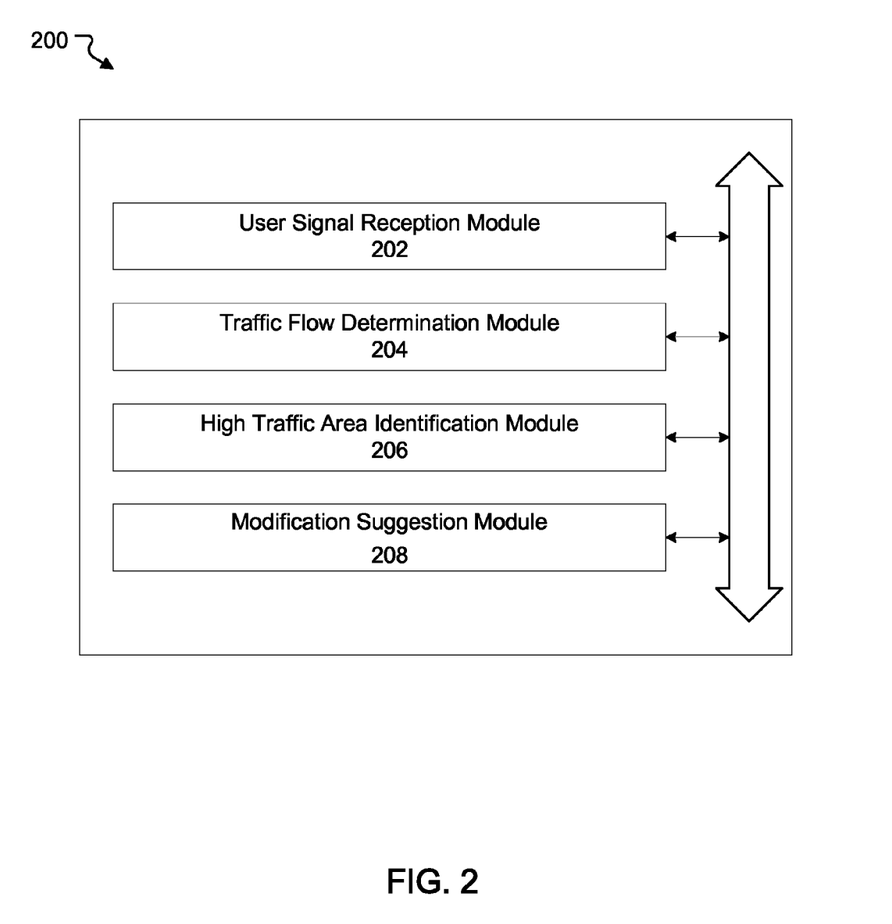
FIG. 2 illustrates an example of a server system for identifying high traffic areas in determined traffic flows and providing suggested modifications to road characteristics.

FIG. 2 illustrates an example of a system for identifying high traffic areas in determined traffic flows and providing suggested modifications to road characteristics. System 200 includes user signal reception module 202, traffic flow determination module 204, high traffic area identification module 206, and modification suggestion module 208. These modules, which are in communication with one another, process information retrieved from data repository 102 in order to identify high traffic areas in determined traffic flows and to provide suggested modifications to road characteristics. For example, user signals indicating locations of several users may be received by user signal reception module 202 at different points in time. Traffic flow determination module 204 may then determine a flow of traffic based an analysis of the locations of the users at the different points in time. High traffic areas may be identified from the determined traffic flow by the high traffic area identification module 206. Once high traffic areas have been identified, modification suggestion module 208 provides a suggested modification to at least one of the road characteristics.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
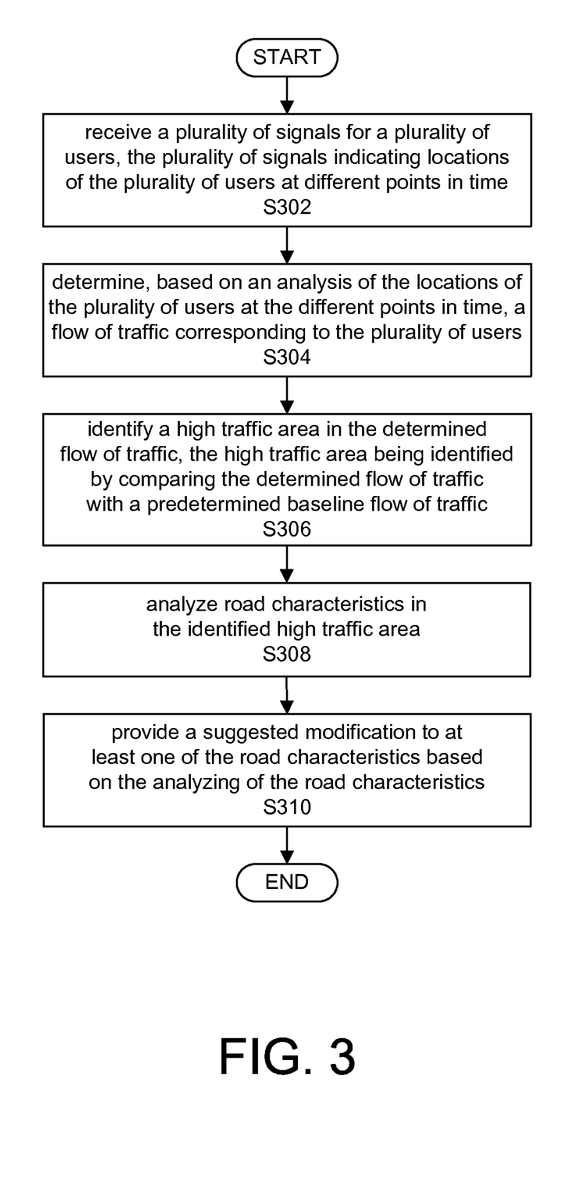
FIG. 3 illustrates an example method for identifying high traffic areas in determined traffic flows and providing suggested modifications to road characteristics.

FIG. 3 illustrates an example method for identifying high traffic areas in determined traffic flows, and providing suggested modifications to road characteristics. Signals indicating locations of several users are received at different points in time in S302. The signals may be received from location enabled devices such as mobile phones and global positioning system (GPS) enabled navigation devices in vehicles, and may provide electronic information such as location information (e.g., GPS coordinates) and a time/date stamp. The signals may further provide an indication of the type of device (e.g., mobile phone, car mounted GPS system, etc.) from which the signal is received. A flow of traffic corresponding to the users may be determined based on an analysis of the locations of the several users at the different points in time in S304. A high traffic area is identified in the determined flow of traffic in S306. In some aspects, the high traffic area is identified by comparing the determined flow of traffic with a predetermined baseline flow of traffic. For example, differences between the identified flow of traffic and the baseline flow of traffic for the particular area over a predetermined threshold may be identified as a high traffic area. For example, a flow of traffic that is determined to be considerably slower than a baseline flow of traffic may be an indication of a high traffic area. Once a high traffic area has been identified, road characteristics in the identified high traffic area are analyzed in S308. A suggested modification to at least one of the road characteristics for a road corresponding to the identified high traffic area is provided based on the analysis of the road characteristics in S310.

Figure 4A:
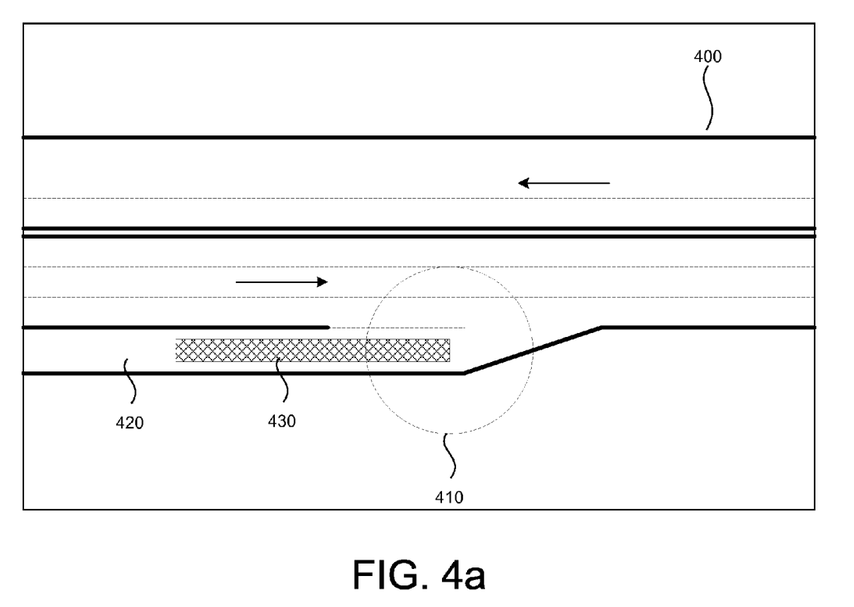
FIGS. 4a and 4b provide graphical representations of an identified high traffic areas in determined traffic flows for which suggested modifications to road structure are provided.

In some implementations, road structure (e.g., number of lanes, direction of traffic, number of intersections, etc.) may be analyzed to determine if the road structure is adversely affecting the flow of traffic. FIG. 4a provides a graphical representation of identified high traffic area 410 in a determined traffic flow. In this example, identified high traffic area 410 corresponds to on-ramp 420 of highway 400. As discussed above, high traffic area 410 is identified by comparing the determined flow of traffic with a predetermined baseline flow of traffic. In this example, traffic congestion 430 is identified by comparing the determined traffic flow of traffic with the predetermined baseline flow of traffic. A flow of traffic corresponding to the signals received for the several users over a fixed duration being determined to be slower than the predetermined baseline results in the identification of traffic congestion 430.

Figure 4B:
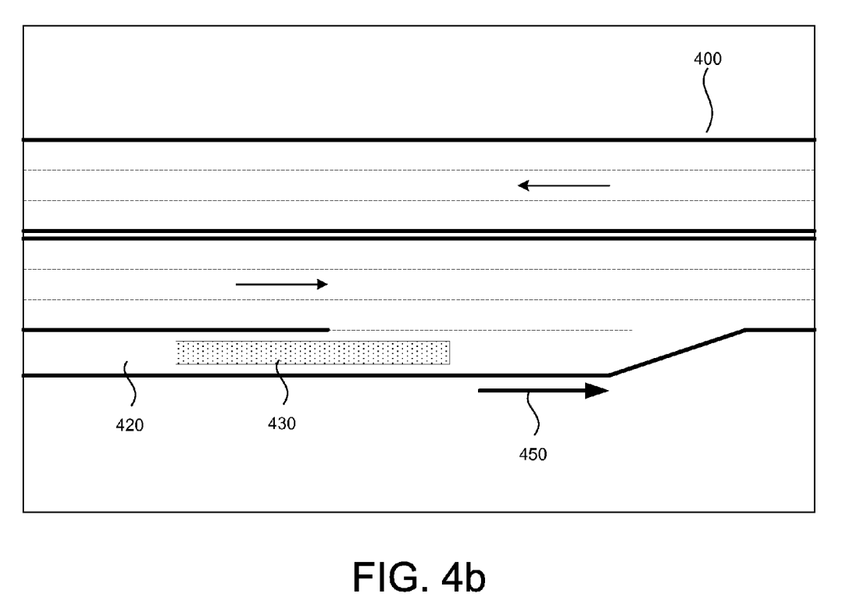

FIG. 4b provides a graphical representation of a suggested modification to the road structure provided as a result of the determination of the high traffic area. For example, when a high traffic area is associated with on-ramp 420 of highway 400, a suggested modification may be provided. In this example, the suggested modification is to build extension 450 into on-ramp 420. In providing a longer on-ramp 420, traffic congestion 430 may be alleviated as vehicles are provided additional distance in which to accelerate and merge. While the above example provides for an extension of an on-ramp, the same analysis may be utilized to suggest adding additional lanes to the roadway, and/or to suggest, for roads for which the direction of travel for each lane is alterable, the number of lanes to be made available for traveling in one direction as opposed to the opposite direction.

Figure 5A:
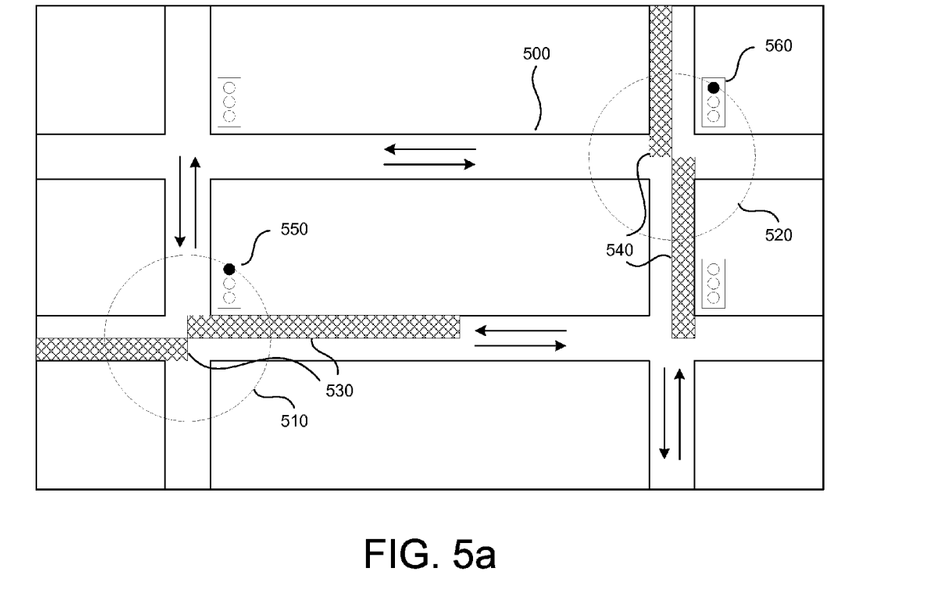
FIGS. 5a and 5b provide graphical representations of identified high traffic areas in determined traffic flows for which suggested modifications to traffic signals are provided.

FIG. 5a provides a graphical representation of an identified high traffic area in a determined traffic flow. In this example, identified high traffic areas 510 and 520 correspond to intersections of roadway 500 controlled by traffic signals 550 and 560. As discussed above, high traffic areas are identified by comparing the determined flow of traffic with a predetermined baseline flow of traffic. In this example, traffic congestion 530 and 540 are identified by comparing the determined traffic flow of traffic with the predetermined baseline flow of traffic. A flow of traffic corresponding to the signals received for the several users over a fixed duration being determined to be slower than the predetermined baseline results in the identification of traffic congestion 530 and 540.

Figure 5B:
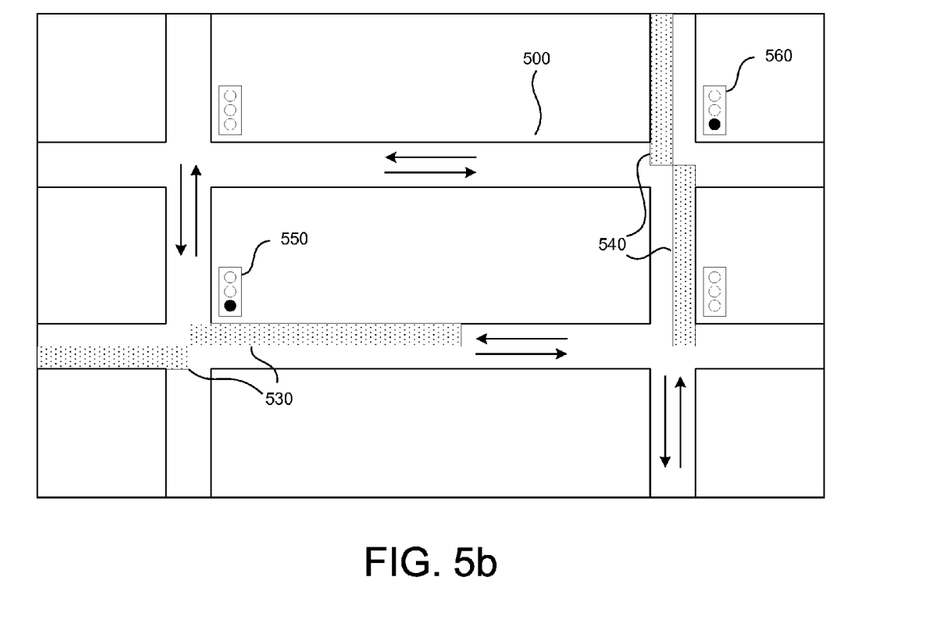

FIG. 5b provides a graphical representation of a suggested modification to traffic signals 550 and 560 provided as a result of the determination of the high traffic area. For example, when a high traffic area is associated with intersections of roadway 500 controlled by traffic signals 550 and 560, a suggested modification to the traffic signal patterns may be provided. In this example, the suggested modification is to alter the light patterns in order to alleviate traffic congestion 530 and 540. By changing the light patterns (e.g., extending the green light) for certain intersections of roadway 500, traffic congestion 530 and 540 may be alleviated as vehicles are provided additional time in which to pass through an intersection.

In some aspects the flow of traffic may be determined based on real-time information. For example, the received signals for several users, on which the determined flow of traffic is based, may be received over a short duration (e.g., 3 seconds).

Based on the location information provided by these signals and the duration at which they are received, a rate of travel may be determined. The rate of travel determined for each signal is then used to determine a collective flow of traffic of all users that correspond to the signals. With the capability to determine the flow of traffic in real-time, suggested modifications to the light patterns may also be provided in real-time. For example, if traffic congestion 530 and 540 are determined in real-time, a suggestion to alter traffic signals 550 and 560 may be provided. By implementing the suggested modification, traffic congestion 530 and 540 may be relieved on a timely basis.

In some aspects, roadways may further be analyzed to determine whether alternative traffic signals such as traffic signs or a live traffic director may alleviate congestion. For example, if it is determined that vehicles making left turns are impeding the progress of vehicles that are proceeding straight, the installation of a "no left turn" traffic sign or a protected left turn green arrow may be provided as a suggested modification. Alternatively, a suggestion of utilizing a live traffic director may be provided. Thus, the modifications are not limited to suggested modifications to current traffic signals, but may also include the implementation of additional/new traffic signals in high traffic areas.

In some implementations, existing traffic signals may be altered remotely or automatically. For example, signs such as "This Lane Closed" or "No Right Turn on Red" may be activated in certain situations based on the analysis of the roadways. A sign indicating "This Lane Closed" may be activated (e.g., illuminated, displayed on a screen, etc.) in order to designate a lane of traffic for traveling in an opposing direction. The changing of such signage may be performed automatically based on a time of the day (e.g., changing the direction of lanes to accommodate rush hour traffic) or determined traffic conditions (e.g., traffic analysis indicating traffic in one direction is considerably heavier than in an opposite direction). The changing of such signage may also be performed based on an input received (e.g., administrator or law enforcement officer providing an input to cause a change in the signage). The "No Right Turn on Red" sign may be similarly changed, either automatically or via a received input.

In some aspects, informational signs may be activated to display a message based on the analysis of the roadways. An informational sign may provide a message such as "Congestion Ahead, Consider Alternate Routes" when an identified high traffic area corresponds to a high volume of vehicles. The informational sign may further provide different messages that correspond to different identified traffic patterns. For example, if the left lane of a highway is determined to be not moving or closed based on the analysis of the roadways, the informational sign may provide a message that read "Left Lane Closed Ahead, Merge Right." Alternatively, the message displayed on the informational sign may be customized base on a received input (e.g., a road administrator may program a sign to provide information on an impending road closure due to construction).

In some implementations, the predetermined baseline flow of traffic to which the determined flow of traffic is compared may be a history of the flow of traffic for a particular road. For example, historical data may be kept for roads. The historical data may be averaged over a period of time to determine a mean flow of traffic to which the determined flow is compared. The historical data may also be sorted by different times of the day and different days of the week to distinguish whether different flows of traffic are associated with different times (e.g., rush hour traffic versus off-hours traffic).

In some implementations, the flow of traffic may be monitored after a modification has been made in order to determine if the modification has alleviated the identified high traffic area. The flow of traffic after implementation of the modification may be compared to the flow of traffic before implementation to determine the effectiveness of the modification, and to determine if any additional modification is necessary. Such feedback information may further be used to adjust traffic signals in real time to alleviate congestion at high traffic areas.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
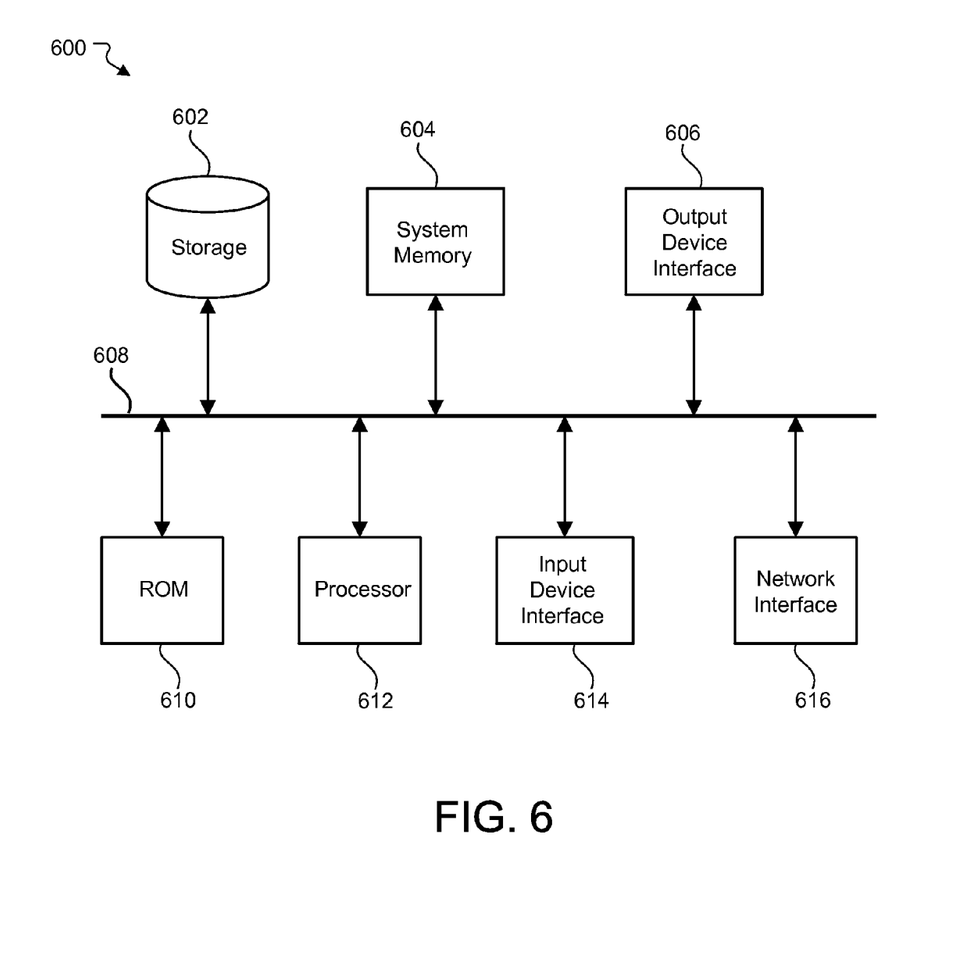
FIG. 6 conceptually illustrates an example electronic system with which some implementations of the subject technology are implemented.

FIG. 6 conceptually illustrates an example electronic system 600 with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions providing a suggested modification to road characteristics in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers, such as a local area network, a wide area network, or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for providing a suggested modification to road characteristics, the method comprising:
   receiving a plurality of signals for a plurality of users, the plurality of signals indicating locations of the plurality of users at different points in time;
   determining, based on an analysis of the locations of the plurality of users at the different points in time, a flow of traffic corresponding to the plurality of users;
   identifying a high traffic area in the determined flow of traffic, the high traffic area being identified by comparing the determined flow of traffic with a predetermined baseline flow of traffic, wherein the predetermined baseline flow of traffic is determined based on an average calculated from historical data of traffic flow for a particular road;
   analyzing road characteristics in the identified high traffic area; and
   providing a suggested modification to at least one of the road characteristics based on the analyzing of the road characteristics.

2. The computer-implemented method of claim 1, wherein the road characteristics comprise at least one of road structures and traffic signals, wherein the road structures include at least one of a number of lanes, a direction of traffic, or a number of intersections, and wherein the traffic signals include at least one of a traffic sign, a traffic director, or a traffic light.

3. The computer-implemented method of claim 2, wherein providing a suggested modification to the at least one of the road characteristics comprises providing a suggestion to modify at least one of the road structures.

4. The computer-implemented method of claim 3, wherein the suggestion to modify the at least one of the road structures corresponds to at least one of lengthening a particular road, widening the particular road, changing a speed limit on the particular road, or changing a direction of traffic on the particular road.

5. The computer-implemented method of claim 2, wherein providing the suggested modification to the at least one of the road characteristics comprises providing for altering the traffic signals.

6. The computer-implemented method of claim 5, wherein the altering the traffic signals comprises at least one of modifying a time interval at which the traffic signals change, modifying a pattern at which the traffic signals operate, adding a traffic signal, or changing a direction of traffic on a particular road.

7. The computer-implemented method of claim 5, wherein the altering the traffic signals comprises at least one of remotely altering a road sign or automatically altering a road sign based on the analyzing of the road characteristics.

8. The computer-implemented method of claim 1, wherein the suggested modification to the at least one of the road characteristics corresponds to the identified high traffic area.

9. The computer-implemented method of claim 1, wherein the plurality of signals for the plurality of users are received from location enabled devices associated with the plurality of users, the location enabled devices comprising at least one of a mobile phone or a global positioning system (GPS) enabled navigation device in a vehicle.

10. The computer-implemented method of claim 1, wherein determining the flow of traffic corresponding to the plurality of users based on the analysis of the locations of the plurality of users at the different points in time comprises:
   identifying, for each user, a first location from which a first signal is received for the user;
   identifying a second location from which a second signal is received for the user; and
   determining the rate of travel based on the distance between the first location and second location, and an elapsed time between the receipt of the first signal and the second signal.

11. The computer-implemented method of claim 10, wherein identifying the high traffic area comprises comparing the determined rate of travel with a rate of travel corresponding to the predetermined baseline flow of traffic, and wherein the high traffic area is identified when the difference between the rate of travel corresponding to the predetermined baseline flow of traffic and the determined rate of travel is greater than a predetermined threshold.

12. A machine-readable medium comprising instructions stored therein, which when executed by a system, cause the system to perform operations comprising:
   receiving a plurality of signals for a plurality of users, the plurality of signals indicating locations of the plurality of users at different points in time;
   determining, based on an analysis of the locations of the plurality of users at the different points in time, a flow of traffic corresponding to the plurality of users;
   identifying a high traffic area in the determined flow of traffic, the high traffic area being identified by comparing the determined flow of traffic with a predetermined baseline flow of traffic, wherein the predetermined baseline flow of traffic is determined based on an average calculated from historical data of traffic flow for a particular road; and
   providing a suggested modification to traffic signals for a road based on the identified high traffic area.

13. The machine-readable medium of claim 12, wherein receiving the plurality of signals for the plurality of users comprises receiving a first set of signals for the plurality of users at a first time, and receiving a second set of signals for the plurality of users at a current time; and wherein the flow of traffic corresponding to the plurality of users is determined based on the first set of signals received at the first time and the second set of signals received at the current time.

14. The machine-readable medium of claim 13, wherein the suggested modification to the traffic signals for a road corresponds to the identified high traffic area.

15. The machine-readable medium of claim 14, wherein the suggested modification to traffic signals for the road corresponding to the identified high traffic area is provided in real-time.

16. The machine-readable medium of claim 12, wherein providing the suggested modification to the traffic signals comprises providing a suggested modification for at least one of altering a time interval at which the traffic signals change, altering a pattern at which the traffic signals operate, adding a traffic signal, or altering the traffic signals to change a direction of traffic.

17. The machine-readable medium of claim 12, further comprising instructions for receiving web-based signals that provide indications of high traffic areas, wherein the indications of the high traffic areas provided by the web-based signals comprises at least one of a construction site, a road closure, or a reported accident, and wherein the high traffic area is further identified based on the received web-based signals.

18. A system for providing a suggested modification to road characteristics, the system comprising:
one or more processors; and
a machine-readable medium comprising instructions stored therein, which when executed by the processors, cause the processors to perform operations comprising:
receiving a plurality of signals for a plurality of users, the plurality of signals indicating locations of the plurality of users at different points in time;
determining, based on an analysis of the locations of the plurality of users at the different points in time, a flow of traffic corresponding to the plurality of users;
identifying a high traffic area in the determined flow of traffic, the high traffic area being identified by comparing the determined flow of traffic with a predetermined baseline flow of traffic, wherein the predetermined baseline flow of traffic is determined based on an average calculated from historical data of traffic flow for a particular road;
analyzing road structures in the identified high traffic area; and
providing a suggested modification to the road structures for a road corresponding to the identified high traffic area based on the analyzing of the road structures.

19. The system of claim 18, wherein the plurality of signals for the plurality of users are received from location enabled devices associated with the users, the location enabled devices comprising at least one of a mobile phone and a global positioning system (GPS) enabled navigation device in a vehicle.

20. The system of claim 18, wherein the instructions for determining the flow of traffic corresponding to the plurality of users based on the analysis of the locations of the plurality of users at the different points in time comprises:
identifying, for each user, a first location from which a first signal is received for the user;
identifying a second location from which a second signal is received for the user; and
determining the rate of travel based on the distance between the first location and second location, and an elapsed time between the receipt of the first signal and the second signal.

21. The system of claim 18, wherein the suggested modification to the road structures for a road corresponding to the identified high traffic area comprise at least one of lengthening the road, widening the road, changing a speed limit on the road, or changing a direction of traffic on the road.

* * * * *